United States Patent
Hirchenhein et al.

(10) Patent No.: US 11,255,278 B2
(45) Date of Patent: Feb. 22, 2022

(54) METHOD FOR ANALYZING A FLUID, A DEVICE FOR THIS PURPOSE THAT INCLUDES MEANS FOR CARRYING OUT THE METHOD, AND A COMPUTER PROGRAM THAT EFFECTUATES CARRYING OUT THE METHOD BY THE DEVICE

(71) Applicant: Robert Bosch GmbH, Stuttgart (DE)

(72) Inventors: Achim Hirchenhein, Bietigheim-Bissingen (DE); Guido Porten, Wiernsheim (DE); Jochen Hofstaetter, Sinsheim-Weiler (DE); Lorenz Oberlin, Tuebingen (DE); Stefan Gottlieb, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/201,914

(22) Filed: Mar. 15, 2021

(65) Prior Publication Data

US 2021/0293190 A1 Sep. 23, 2021

(30) Foreign Application Priority Data

Mar. 20, 2020 (DE) ..................... 10 2020 203 662.4

(51) Int. Cl.
| | |
|---|---|
| *F02D 35/00* | (2006.01) |
| *F02D 41/22* | (2006.01) |
| *F02D 41/14* | (2006.01) |
| *G01M 3/02* | (2006.01) |
| *G01M 3/00* | (2006.01) |

(52) U.S. Cl.
CPC ..... *F02D 35/0092* (2013.01); *F02D 41/1454* (2013.01); *F02D 41/22* (2013.01); *F02D 2041/225* (2013.01); *G01M 3/002* (2013.01); *G01M 3/025* (2013.01)

(58) Field of Classification Search
CPC .. F02D 35/0092; F02D 41/1454; F02D 41/22; F02D 2041/225; G01M 3/002; G01M 3/025; G01M 3/007
USPC ........................................ 123/445
See application file for complete search history.

(56) References Cited

U.S. PATENT DOCUMENTS

| | | | |
|---|---|---|---|
| 3,827,237 A | 8/1974 | Linder et al. | |
| 10,337,443 B1 * | 7/2019 | Ulrey | ................. F02D 35/0015 |
| 10,436,142 B2 | 10/2019 | Ulrey et al. | |
| 10,519,888 B2 | 12/2019 | Huang et al. | |

(Continued)

FOREIGN PATENT DOCUMENTS

| | | | | |
|---|---|---|---|---|
| DE | 2216705 A1 | 10/1973 | | |
| DE | 102008041537 A1 * | 3/2010 | ........... | F02M 65/001 |

(Continued)

*Primary Examiner* — Mahmoud Gimie
(74) *Attorney, Agent, or Firm* — Norton Rose Fulbright US LLP; Gerard Messina

(57) ABSTRACT

A method for analyzing a fluid that flows from a chamber, in particular a combustion chamber, of an internal combustion engine into a fluid guide. The internal combustion engine includes at least one element, in particular an injector, for the supply of fuel. The analysis takes place with the aid of a sensor, in particular a lambda sensor, on which the fluid in the fluid guide acts. The analysis takes place during cranking of the internal combustion engine, and the fluid acting on the sensor is not influenced by fuel that is supplied in a controlled manner.

20 Claims, 5 Drawing Sheets

(56) References Cited

U.S. PATENT DOCUMENTS

| | | | |
|---|---|---|---|
| 2008/0302176 A1* | 12/2008 | Friedl | ................... F02D 41/062 |
| | | | 73/114.45 |
| 2019/0316542 A1 | 10/2019 | Kylstrom et al. | |
| 2019/0390622 A1* | 12/2019 | Saleem | ............... F02D 41/1454 |
| 2020/0003144 A1 | 1/2020 | Faied | |

FOREIGN PATENT DOCUMENTS

| | | |
|---|---|---|
| DE | 102016115949 A1 | 3/2017 |
| DE | 102019208018 A1 | 12/2020 |

* cited by examiner

METHOD FOR ANALYZING A FLUID, A DEVICE FOR THIS PURPOSE THAT INCLUDES MEANS FOR CARRYING OUT THE METHOD, AND A COMPUTER PROGRAM THAT EFFECTUATES CARRYING OUT THE METHOD BY THE DEVICE

CROSS REFERENCE

The present application claims the benefit under 35 U.S.C. § 119 of German Patent Application No. DE 102020203662.4 filed on Mar. 20, 2020, which is expressly incorporated herein by reference in its entirety.

BACKGROUND INFORMATION

Demands on the diagnosis of fuel systems for internal combustion engines, in particular gasoline engines that operate according to the Otto principle or engines that are spark-ignited, are resulting in increasingly specialized analytical methods. These are provided, for example, to allow compliance with emission limitations. For this purpose, for example a detection may be used that recognizes leaking injectors and thus, a fuel quantity that has passed uncontrolled into a portion of the internal combustion engine (injector leak detection). Such a detection is intended to recognize the case that fuel escapes inadvertently/in an uncontrolled manner into the combustion chamber via a valve seat of an injector (leak into the combustion chamber). One reason for such an error may be, for example, impurities from the manufacture of the injectors, in which, for example, particles from machining deposit in the valve seat of injectors, for example, resulting in leaks. This may be the case for injectors that include a nozzle that opens to the outside (so-called A-nozzle). In principle, leaks may likewise occur with magnetically driven multipole injectors (MHIs). Depending on the magnitude of such a leak, it may result in different error responses by the internal combustion engine. When such an internal combustion engine is operated during normal driving operation of a motor vehicle, the behavior of such internal combustion engines is generally not noteworthy. This is due to the fact that overall, even very large leaks make up only a comparatively small portion of a total fuel quantity that is individually injected into a cylinder. This small portion is much less than 3%, for example. The mentioned error responses encompass a spectrum that ranges from a worsening of the emissions which result in no engine effects that are noticeable to the driver, to perceivable misfires during starting, to over-enrichment of the mixture in the combustion chamber or in a phase after starting. In addition, for direct injection engines this may result in poor starting due to a delayed buildup of high pressure, in particular in start-stop driving conditions.

As a detection method for leak-prone high-pressure injectors, in the related art, typically two or multiple independent so-called signal paths are considered. A first signal path evaluates a temporal profile of a rail pressure with the aid of the installed high-pressure sensor. However, this method is sensitive to any leaks in the high-pressure system. Thus, this method also responds to internal leaks in the high-pressure pump, via which the compressed fuel flows back into the low-pressure circuit. As a result, no fuel escapes to the outside, for example into a combustion chamber of a cylinder in the present case. For this reason, this method has sufficient accuracy (sensitivity) only when the leak values of the injectors are very high. In addition, this method is not suitable for associating leaks with individual cylinders, so that evaluation cannot be carried out on a cylinder-specific basis. A so-called combustion stability of the individual cylinders is or may be assessed as an additional, independent method. German Patent Application No. 10 2019 208 018 describes this method. As described above, misfires occur only in the initial combustions after a start or poststart, since the fuel that has escaped into the combustion chamber, due to fairly long shutdown phases of the internal combustion engine, results, at least initially, in an over-enrichment of the mixture. By assessing the combustion stability in the start/poststart phase, an error analysis is possible via which cylinder-specific malfunctions are evaluatable.

During the rotational speed runup and also in the poststart phase, the stated over-enrichment of the combustion chamber mixture results in altered signal behavior of the exhaust gas sensor or lambda sensor compared to the nominal system (error-free system). The assessment of the signal pattern of an exhaust gas sensor or lambda sensor may thus be utilized as a further independent method.

Furthermore, certain conventional methods, described, for example, in German Patent Application No. DE 22 167 05 A1, allow a composition of a fluid (exhaust gas) in a fluid guide (exhaust pipe) to be analyzed with the aid of a lambda sensor, and an exhaust gas composition to be changed with the aid of a control cycle.

SUMMARY

According to a first aspect of the present invention, a method for analyzing a fluid is provided, the fluid flowing from a chamber, in particular a combustion chamber, of an internal combustion engine into a fluid guide, for example an exhaust pipe, an exhaust gas routing, or an exhaust gas routing beginning at a so-called exhaust valve. The internal combustion engine also includes at least one element, in particular a valve, for supplying fuel. In accordance with an example embodiment of the present invention, the analysis takes place with the aid of a sensor that is designed in particular as a so-called lambda sensor. During this method, the fluid in the fluid guide acts on this sensor. The analysis of the fluid takes place during cranking of the internal combustion engine while the element for the supply of fuel is closed. In other words, the analysis takes place during cranking of the internal combustion engine, using the fluid that is not influenced by the controlled supplying of fuel after the cranking has begun, since this fluid has not been influenced by fuel after the beginning of cranking. Fuel added with possible control has been added with control prior to the cranking. In the present case, "cranking of the internal combustion engine" means that a shaft, in particular a drive shaft of the internal combustion engine, for example a crankshaft, is rotated by an auxiliary drive machine. Independent run-up of the internal combustion engine is not possible during the cranking. This auxiliary drive machine may be an electric machine, for example, that directly drives the shaft of the internal combustion engine (crankshaft starter) or that is driven by a conventional starter, for example, for example with the aid of a gear, made up of an annular gear and a pinion, for example, situated in between. As mentioned, during the method provided here the fluid must not be influenced by the controlled supply of fuel. This may mean, for example, that the corresponding element of the internal combustion engine (injector, for example) is not activated, and therefore no supply of fuel, in particular into the chamber (combustion chamber) or into the fluid guide, takes place.

One advantage of this method sequence in accordance with an example embodiment of the present invention is that during the analysis of the fluid, it may thus preferably be ruled out that the fluid is adversely affected by fuel that has recently entered into the fluid guide (introduced in a controlled manner). When the method is carried out, it may therefore be concluded with certainty that the quantity of trace fuel in the fluid originates from a leaking/uptight element. In the method, starting operations are thus assessed with regard to the lambda signal pattern or sensor signal pattern during the start/poststart phase. Thus, only starting operations are assessed in which solely the injector leak may have a significant effect on the signal pattern of the sensor, or may result in a corresponding effect on the criterion derived therefrom. Within the scope of the method sequence, limitations on certain suitable states of the system may be productive. For example, states of the system (internal combustion engine and its auxiliary units) that prevail when shutting down or switching off the internal combustion engine may be taken into account: these states include, for example, a sensor/lambda value, a rate of the tank venting, a state of the crankcase venting, and other states.

The tank venting and crankcase venting may influence the lambda signal due to the fact that when the internal combustion engine is stopped, fuel components from the tank venting and crankcase venting may still be contained in the intake manifold. When the internal combustion engine is started, in this case not only air but also an unknown air/fuel mixture is conveyed to the lambda sensor. This results in measured values similar to those for a leaking injector.

According to a further aspect of the present invention, it is provided that the analysis of the fluid for a leak quantity of the fuel is ended only after the start of controlled supply of fuel into the chamber, but before fluid, which has flowed out of the chamber and is enriched with the fuel, reaches the sensor. As is conventional in the field of internal combustion engines, supply of fuel into the chamber or combustion chamber typically takes place, for example, shortly before the so-called top dead center (TDC) and optionally shortly after TDC. For example, a TDC of 180 angular degrees (crankshaft degrees or drive shaft degrees) or greater may elapse before this quantity of fuel that is combusted in this chamber or the corresponding fluid reaches the location where the sensor may emit a signal at or in the fluid guide. This allows a particularly long analysis time. According to a further example embodiment of the present invention, it is provided that the analysis takes place prior to supply of fuel, in particular into the chamber or into this fluid guide, that occurs by activating an element (an injector, for example) of the internal combustion engine. As a result, in and during the analysis it is ensured that no fuel components, introduced in a controlled manner, are introduced into the fluid.

During the analysis, a signal of the sensor is evaluated, and a proportion of in particular uncombusted or partially combusted fuel in the fluid is ascertained. The uncombusted fuel is intended to be regarded as a fuel that has left an element in an uncontrolled manner (leak quantity), and the partially combusted fuel is to be attributed to incomplete charge cycles. During the analysis, if no leak quantity or a permissible leak quantity is deduced due to the evaluation of the signal of the sensor, it is provided to continue operation of the internal combustion engine, since, based on the above-mentioned criteria, there is no indication of a defective element. Accordingly, it is expected that the exhaust gas composition corresponds to the requirements. During the analysis, if an impermissibly high leak quantity is deduced due to the evaluation of the signal of the sensor, it may be advantageously concluded, for example, that the or multiple or one of the elements of the internal combustion engine, for example one or multiple of the injectors or valves, is/are defective. Based on the conclusion that an impermissibly high leak quantity has been deduced due to the evaluation of the signal of the sensor, it is possible either to continue operation of the internal combustion engine, or alternatively, to not continue operation of the internal combustion engine. Continuing the operation of the internal combustion engine is indicated, for example, when the internal combustion engine is still reliably operable, i.e., delivers the intended power for moving the motor vehicle, and it is thus possible, for example, to drive to a repair shop for inspection and possibly repairs. For example, during the analysis, if an impermissibly high leak quantity is deduced due to the evaluation of the signal of the sensor and a decision is made not to continue operation of the internal combustion engine, this may be due to the fact, for example, that further damage to the internal combustion engine could be possible, and therefore further operation is regarded as impermissible. However, a further, and optionally additional or alternative, reason for not operating the internal combustion engine after identifying the defect may be, for example, an impermissible composition of the exhaust gases which absolutely requires repairs before further operation of the internal combustion engine. According to one aspect of the present invention, during the analysis, due to the evaluation of the signal of the sensor it is provided that a signal pattern of the sensor is compared to a reference signal pattern, and when a deviation is exceeded, an impermissibly high leak quantity and thus a defective element are deduced. A signal pattern of the sensor may be a consecutive series of individual signal values of the sensor which in succession depict a more or less in particular continuous signal pattern of the sensor. For example, a signal is ascertained for each crankshaft degree or for each drive shaft degree, so that a value, for example a lambda value, is available for each crankshaft degree or drive shaft degree. A reference signal pattern in principle corresponds to a signal pattern of the sensor; however, this is a particular signal pattern. This reference signal pattern is, for example, an example signal pattern that has been ascertained beforehand for an internal combustion engine of the same type having fully functional elements. In this regard, for example a permissible deviation from the reference signal pattern is predetermined. Reasons for such a permissible deviation may be, for example, that measuring errors or evaluation errors are typically unavoidable, and likewise manufacturing defects or manufacturing deviations and manufacturing tolerances for components involved with this method not only cannot be ruled out, but in principle are to be expected. Due to these tolerances which are therefore permissible, deviations may result which may still allow a permissible operating state of the internal combustion engine to be deduced. If such a provided deviation or its threshold value is exceeded after a certain operating time of the method or analytical method, in particular an impermissibly high leak quantity and thus a defective element may therefore be deduced. As an example, it is noted here that, for example, if a deviation of a sensor or lambda value of 0.1 is exceeded approximately 300 milliseconds after the analytical method is started, an impermissibly high leak quantity and thus a defective element may be deduced. According to a further aspect of the present invention, it is provided that an earliest start of a signal evaluation of the sensor and/or a latest end of a signal evaluation of the sensor is determined for the purpose of determining a possible impermissibly high leak quantity. Thus, an earliest start of a signal evaluation of the sensor cannot be prior to, for example, reaching an operating temperature of the sensor, since otherwise, erroneous results may be obtained and thus incorrect conclusions may be drawn. For example, if the sensor mentioned here, in particular the lambda sensor, is not at its proper operating temperature, a faulty operation is typically present here. For this reason, it may be necessary, for example, for the lambda sensor to be initially heated to its operating temperature with the aid of a sensor heater. Reaching the operating temperature may then indicate, for example, the earliest start of a meaningful/method-appropriate signal evaluation of the sensor. With regard to the latest end of a signal evaluation of the sensor, for example the above-mentioned situation comes into consideration, according to which a latest end is prior to the time that fluid, which already includes fuel that is supplied in a controlled manner, reaches the sensor. Such a fuel component ultimately also ascertained as erroneous would make the method provided here meaningless. As a further earliest start of a signal evaluation of the sensor, a drive shaft of the internal combustion engine may be a function of a rest rotational position, for example. In particular this is, for example, a function of a so-called exhaust valve of a combustion chamber. The earlier after a standstill of the internal combustion engine a next exhaust valve opens a combustion chamber within the scope of the method, the earlier a start may be from the standpoint of this technical feature. Thus, for example, if an opening point in time of a next exhaust valve is imminent, by excitation of the gas exchange with the aid of starting movement of a drive shaft of the internal combustion engine the fluid is discharged from this combustion chamber into the fluid guide and guided to the sensor as early as possible due to the piston movement. In contrast, for a one-cylinder engine, for example, if it is provided that the exhaust valve does not begin to open until after one-half a revolution of the drive shaft, a start of a signal evaluation of the sensor, computed from the start of the rotary motion of the drive shaft, is to be correspondingly later. Such an operation allows the limitation of the so-called time window or its start to be set in such a way that the signal evaluation is present only at points in time that are technically meaningful, because they are meaningfully evaluatable in the first place. In other words, if a signal evaluation of the sensor were to already begin at a point in time at which it is technically foreseeable that the next exhaust valve is not opened until after one-half a crankshaft revolution, a signal evaluation is started too early for this at least one-half crankshaft revolution. However, the method may still be started this early.

According to a further aspect of the present invention, it is provided that a start of the signal evaluation of the sensor begins, preferably at the latest, with the start of an expected increase of a lambda value. The term "expected increase of a lambda value" is intended here to mean, for example, the above-mentioned reference signal pattern. Namely, it has been established that in the cases in which an uptight, i.e., leaking, element is to be expected or this has been determined, the corresponding value of the signal of the sensor, starting from the same boundary conditions, such as the start of the evaluation, for example, is measurable only later, for example, when a sensor value of lambda=1.1 is reached. This may be 160 milliseconds, for example.

According to a further aspect of the provided method, it is provided that prior to starting the analysis, the sensor is heated to a temperature, i.e., its operating temperature, since otherwise, erroneous results and therefore incorrect sensor values are ascertained. In addition, it may be advantageous to at least observe a predetermined standstill time (stop phase, shutdown phase) of the internal combustion engine (first standstill time) at a start of the analysis. The reason is that a leak quantity is ultimately the result of a process that is a function of time, for example. Thus, it may very well be the case that a defective, i.e., leaking, element (injector, valve) allows a leak quantity that is barely permissible within 6 hours, for example, while after a standstill time of 12 hours (first standstill time), for example, it would be determined that the discharged leak quantity allows damage of a corresponding element to be deduced.

By use of the method in accordance with the present invention, it may also be ascertained at which or with which individual cylinder a leak of an element is to be associated. The flow of the fluid in the fluid guide is made up of the masses (air, combustion residues, and optionally freshly leaked-in fuel) that leave the individual cylinders in succession during cranking. A shutdown position of the internal combustion engine is either known upon shutdown after a most recent operating phase and stored, or is ascertained upon cranking, or upon cranking, the position in which the individual pistons are in is ascertained. This engine mechanism, the points in time at which the particular exhaust valves open, the distance of a pipe connection of the fluid guide between the exhaust valve and the position of the sensor with respect to the exhaust valve, and a known or ascertained flow speed result in the knowledge of when a mass has left a cylinder.

If a signal of the sensor correlates with a certain mass from a cylinder, a sensor signal that is identified as a signal for a defective element may be used to deduce in which cylinder the element in question is defective. Accordingly, in accordance with an example embodiment of the present invention, a method is provided in which a sensor signal that represents a fluid containing uncombusted fuel is associated with a certain cylinder, and this sensor signal is thus associated with a certain element that is associated with this cylinder.

Moreover, a device including means and a control and regulation device of an internal combustion engine is provided which is designed to carry out the method according to the above features and aspects. Furthermore, a computer program is provided that includes commands which, when they run in the control and/or regulation device of the device as described above, cause the device to carry out the mentioned method steps.

The present invention is explained in greater detail based on the figures.

DETAILED DESCRIPTION OF EXAMPLE EMBODIMENTS

Figure 1:
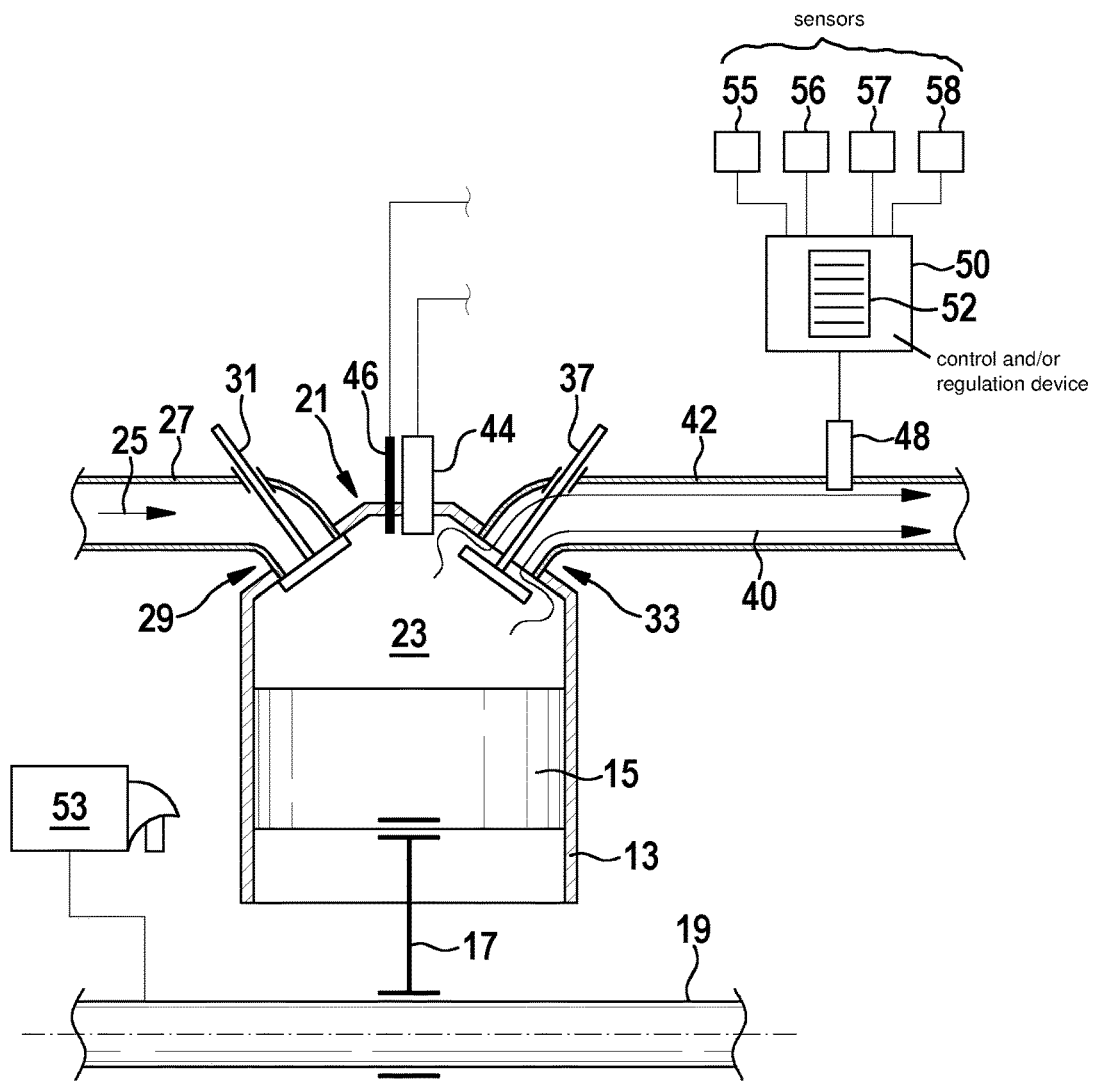
FIG. 1 shows a schematic illustration of an internal combustion engine, in accordance with an example embodiment of the present invention.

FIG. 1 shows an internal combustion engine 10 in a highly schematic manner. This internal combustion engine 10 includes a cylinder 13; this internal combustion engine 10 may include not only one cylinder 13, but, rather, two, three, four, five, six, or more cylinders 13, for example, in a conventional manner. A piston 15 that is coupled to a drive shaft 19 via a swivel joint, not specifically identified here, and a connecting rod 17 is situated in a cylinder. Drive shaft 19, which is schematically illustrated here, may be designed as a crankshaft, for example. Cylinder 13 is closed off above piston 15 by a cylinder head 21. Between one another, cylinder head 21 and piston 15 delimit a chamber 23, typically referred to as a combustion chamber. Chamber 23 is used in a conventional manner to accommodate a mixture of air and fuel situated therein, and to contain this mixture during a combustion initiated by an ignition operation, and to transfer the resulting pressure increase in chamber 23, as a corresponding force, via piston 15 and connecting rod 17 to drive shaft 19 in order for the drive shaft, likewise in a conventional manner, to drive a motor vehicle, for example, or in the event that internal combustion engine 10 is a stationary machine, a power unit (an electric generator, for example).

In conjunction with the combustion operation described above, fresh air must be able to flow into the combustion chamber, which is symbolically indicated here by arrow 25. This fresh air 25 is led to chamber 23 via an intake manifold 27 (intake stroke). In order for this fresh air 25 to be able to flow into chamber 23, this fresh air 25 must pass through an intake valve 29. This intake valve 29 includes a so-called valve seat that is introduced into cylinder head 21, and a valve closure 31 that interacts with same. During the combustion operation in chamber 23, valve closure 31, and thus intake valve 29, is closed (power stroke). To allow the combusted gas mixture (exhaust gas) to leave chamber 23 in an exhaust stroke following the power stroke, an exhaust valve 33 is opened at the right time in a conventional manner. This exhaust valve 33 also includes a valve seat and a valve closure 37 that interacts with same. After passing through exhaust valve 33, the exhaust gas, referred to here as fluid 40, flows into a fluid guide 42. Fluid 40 is likewise symbolically illustrated here by arrows.

Fluid guide 42 mentioned here may also be referred to as an exhaust pipe or exhaust gas routing. Also illustrated in this exemplary embodiment is an element 44 which may also be referred to as a valve, injection valve, high-pressure injector, or injector. This element 44 is provided to inject fuel into chamber 23 so that the fuel may mix with the fresh air situated there, and after initiation of an ignition operation may combust to form exhaust gas. For initiating the mentioned ignition operation, an ignition device 46 (a spark plug, for example) may preferably be mounted at cylinder head 21 in such a way that the ignition device may ignite this mixture of fresh air 25 and fuel. A sensor 48 is situated in mentioned fluid guide 42, so that the sensor is able to analyze a composition of fluid 40 with the aid of further technical devices, or to properly respond to fluid 40 flowing against, past, or through same. Sensor 48 mentioned here may be a so-called lambda sensor. Sensor 48 is connected to a control and/or regulation device 50 so that a signal that is generated by sensor 48 may be evaluated by this control and/or regulation device 50. For example, measured values of other sensors 55, 56, 57, 58 also influence the operations of control and/or regulation device 50. The symbolic illustration shows a computer program 52 that includes commands which, when they run in control and/or regulation device 50 of the device, carry out the method described below or its method steps.

Figure 2:
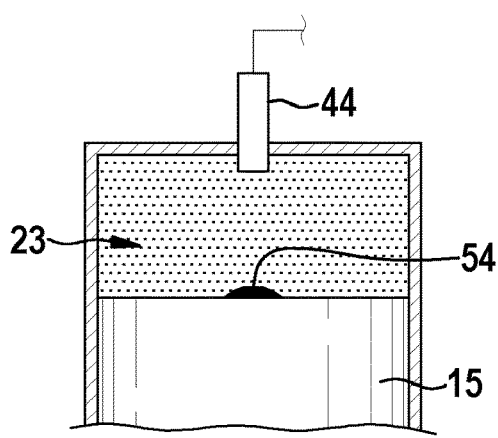
FIG. 2 shows a schematic illustration of a reason for the provided method in accordance with the present invention.

FIG. 2 schematically illustrates a reason for the provided method. If element 44 as described above is defective, so that fuel 54 escapes inadvertently or uncontrolled via the valve seat of element 44 into chamber 23 (leak into the combustion chamber), this results in an increasingly greater proportion of fuel 54 in the content of chamber 23. It is symbolically illustrated here that this leak quantity of fuel 54 is deposited as a drop (liquid) on a surface of piston 15. It is possible that the quantity of fuel 54 escaping from element 44 does not deposit itself as a drop, but, rather, for example is dissolved in the air or fresh air situated in chamber 23. However, a mixture of both (liquid, gas) may also form in chamber 23.

According to the method provided in accordance with the present invention, it is possible to detect such leak quantities and thus deduce a defect of such an element (valve).

Figure 3:
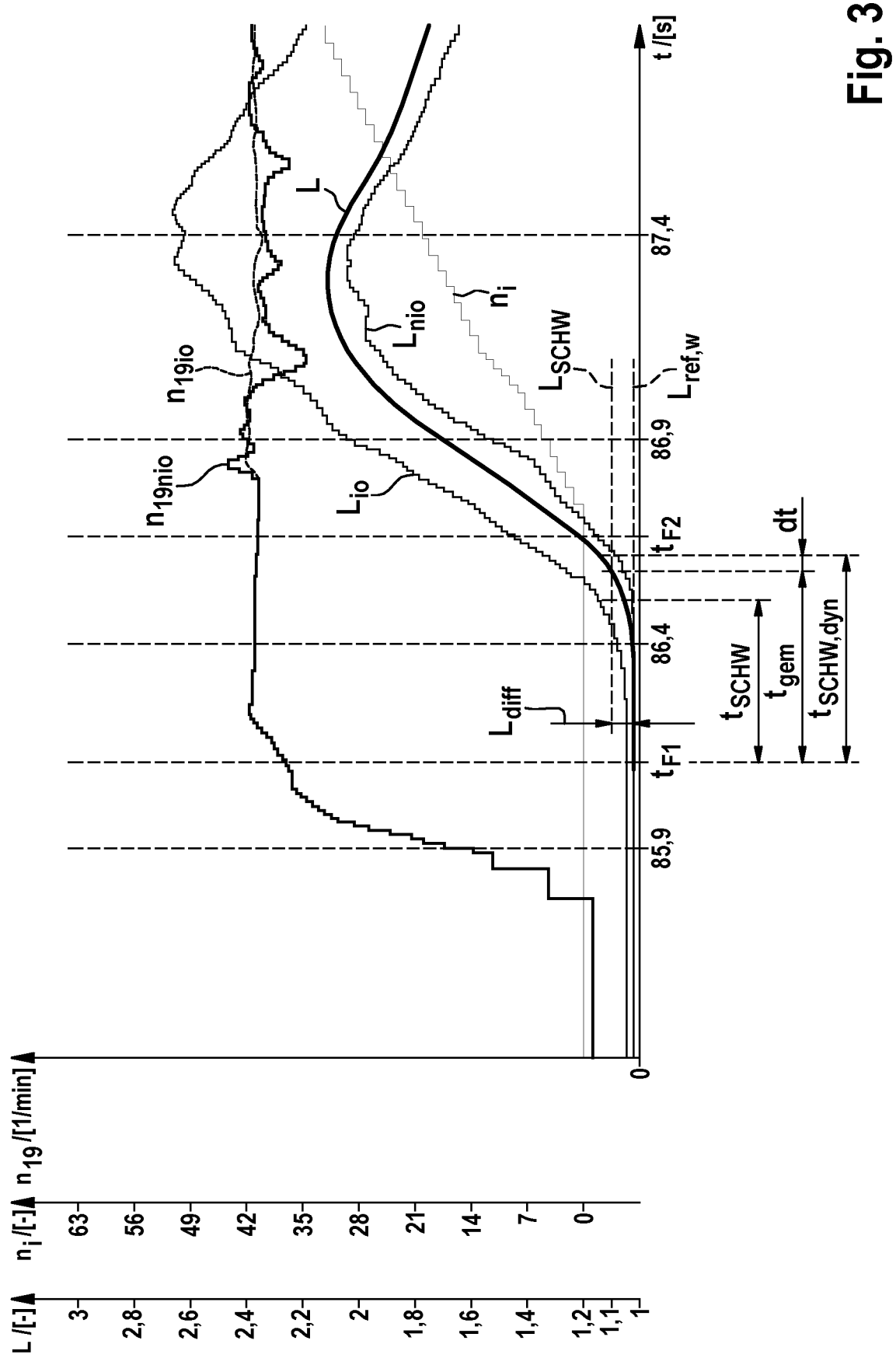
FIG. 3 shows a first diagram that illustrates a pattern of various properties during operation of an internal combustion engine at the beginning of a start. Various patterns of a sensor signal (lambda value) are illustrated for two different system states.

FIG. 3 illustrates a diagram showing various measured and/or computed variables. The X axis shows the elapsed time in seconds. The time at zero seconds is initially not coupled to an event. Various curves, which overall are to be associated with two different states of an internal combustion engine 10, are illustrated as a function of this time pattern. Thus, for example, two curves n19nio, n19io are illustrated. Curve n19io describes a rotational speed pattern of an internal combustion engine 10 whose state, and in particular element 44 here, is functioning properly and thus is not leaking. Curve n19nio shows the rotational speed pattern of drive shaft 19 of internal combustion engine 10 in which an element 44 is not functioning properly, i.e., is leaking in this case. As is clearly apparent here, the patterns of the rotational speed curves, in particular in the range of the idling speed beginning at approximately time t=86.8 seconds, are very different. While curve n19io extends relatively uniformly, curve n19nio shows several abrupt changes in rotational speed or deviations upwardly and even stronger downwardly. Two curves Lio and Lnio are also illustrated in this diagram. For the time illustrated here, each value depicts the pattern of the value of lambda (L) that has been ascertained by sensor 48 in fluid guide 42. It is clearly apparent here that the two patterns are different except for a small range at the start of a measuring window beginning at tF1. A further curve, curve ni, indicates at which point in time a next injection into a cylinder 13 of internal combustion engine 10 takes place. Each stage illustrated here stands for a further injection that has taken place. It may be recognized from both curves Lnio and Lio that the amplitudes are very different.

Signal pattern Lio shows that the lambda signal is already increasing very early toward lean. This means that internal combustion engine 10 must include a high proportion of air in the aspirated air/fuel mixture. Signal pattern Lnio initially shows a much later increase toward lean (starting from reference value tF1). This means that the aspirated air must be contaminated with fuel components from the leak (after a long standstill time).

It is shown here that a signal pattern Lio, Lnio of sensor 48 is compared to a reference value Lref,w, and in the event that a deviation Ldiff exceeds a threshold Lschw after a certain time tschw after measuring window tF1 starts, an impermissibly high leak quantity and thus a defective element 44 are deduced. In the example, signal pattern Lio exceeds threshold Lschw prior to a certain time tschw after measuring window tF1 starts, and signal pattern Lnio exceeds threshold Lschw after a certain time tschw after measuring window tF1 starts. Conversely, this means that a signal pattern Lio, Lnio of sensor 48 is compared to a reference value Lref,w, and in the event that a deviation Ldiff exceeds a threshold Lschw prior to a certain time tschw after measuring window tF1 starts, a properly functioning element 44 is deduced.

Figure 4:
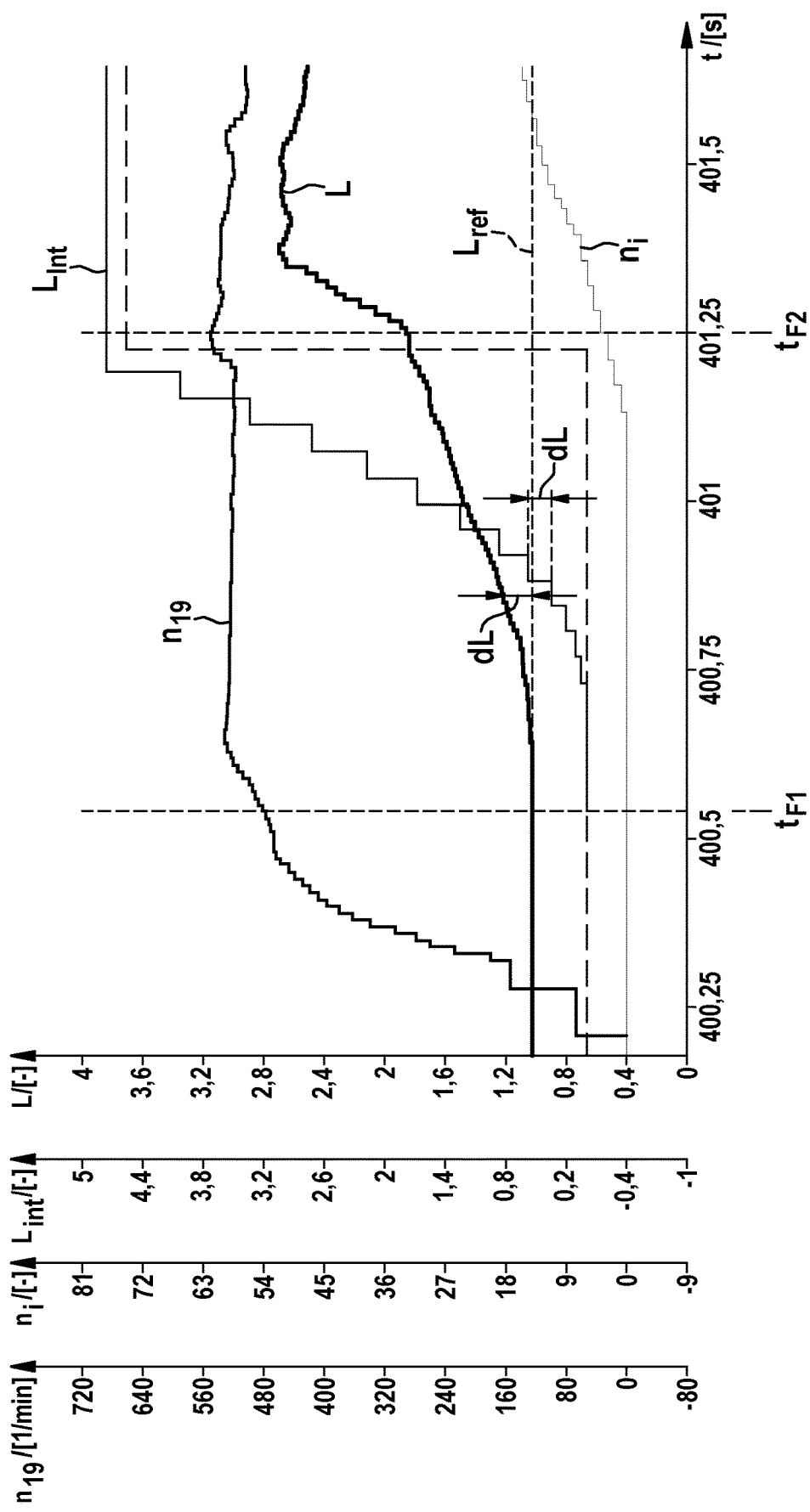
FIG. 4 shows a further diagram with the pattern of variables during a starting operation, this illustration relating to an internal combustion engine whose system state has no errors.

FIG. 4 shows a further illustration of various curves recorded during the operation of an internal combustion engine 10. Since this underlying internal combustion engine 10 is functioning properly, rotational speed pattern n19 illustrated here is a rotational speed pattern of an internal combustion engine 10 that is functioning properly. In addition, a straight horizontal line for a reference value lambda L=1.0 is illustrated here as a reference line. Furthermore, the pattern of measured lambda L is illustrated. A reference value Lref (straight, horizontally extending line) is illustrated here as a further curve pattern. This value Lref is preferably stored as a reference value at the beginning of the engine start. Of course, at the start of the measuring operation for the particular instantaneous value of lambda, the result is open; i.e., at this moment it is not yet known whether Lio or Lnio is involved. The measurement is started here at point in time tF1. Within the scope of defined measuring steps, for example as a function of the crankshaft or shaft rotation (crankshaft angle degree) already elapsed, in each case an instantaneous value lambda L is measured and ultimately added in succession to curve/polygonal line/stepped line L. Within a measuring window, in the present case beginning at time tF1, for preferably each measured value of a lambda L a difference between this instantaneous sensor measured value L and mentioned reference value Lref is ascertained. With each further measuring step, a newly ascertained difference value is formed from the instantaneous sensor measured value and the reference value. During the first measurement, the first ascertained difference value corresponds to a first sum. Each further difference value is added to the particular previously ascertained sum value (integration of the difference between the instantaneous sensor measured value and the reference value). At the end of the measuring window, in the present case at point in time tF2, the total value of this integration process (integrator value) is then checked for a limit, referred to here as an error threshold, not being reached or being exceeded. In this example, at the end of the integration process at point in time tF2 (end of the measuring window), integrator value Lint here reaches a total value of 4.77. If integrator value Lint in this case had not exceeded the value of 3.0, for example, the result would have been that within the scope of the method a defect in element 44 would have been determined or a defect would have been deduced. As is also apparent in this case, the method is not ended until after the start of the injection activity by elements 44 into chamber 23.

As an example, a measured value is ascertained with each synchro-raster (i.e., synchronously with the ignition), in the case of an internal combustion engine 10 including four cylinders, at an interval of 180° crankshaft angle, and for six cylinders, at an interval of 120° crankshaft angle.

In the method provided here in accordance with the present invention, by integrating the difference between the instantaneous sensor measured value and the reference value this may also optionally take place using averaged measured values. The computed indicator (integrator value) from the pattern of the signal of sensor 48 is for example then compared to a measured pressure drop of a so-called rail within the so-called stop phases of internal combustion engine 10 during the start/stop operation. This means that a plausibility check of the described method is possible via this additional (not absolutely necessary) cross check. Thus, if the integrator value, due to nonexceedance of a threshold value, indicates a defect of an element 44, this may optionally be confirmed by a corresponding pattern of the pressure drop of the rail. Accordingly, a pressure drop of the rail due to a defective, leaking element 44 would be greater than in the normal case. If one or both indicators mentioned here (integrated lambda value, pressure drop in the rail) allow(s) an impermissible leak to be deduced, further diagnostic measures may be initiated in order to confirm the indicated error, optionally using further methods. In conjunction with FIG. 4 and also FIG. 3, for example two times tF1, tF2 are indicated which in the present case determine a length of a measuring window. It is important to take into account all relevant influencing factors, which are to be derived from different shutdown and start states, for such a determination of a measuring window or its length. Thus, for example, the measuring window may be tracked in a so-called dynamic manner. This means that, for example, the start as well as the end, and thus also the length of a measuring window, may be determined differently as a function of a so-called engine shutdown position. Further influencing variables may be an instantaneous intake cam contour (in particular for adjustable intake camshafts), the state of the drive train (in the present case, for example as a function of the clutch state), the selected situation of a gear shift (for example, neutral or a certain engaged gear), or also a starting strategy. The so-called starting strategy encompasses, for example, a driving program which may be provided in present vehicles, for example via a particularly economical mode (eco) or a fairly sporty mode, or for example via a particularly comfortable mode. In addition, in particular sensor properties, in the present case in particular the so-called dynamic behavior of a broadband sensor, are also to be taken into account for selecting the measuring window.

An assessment of the signal behavior based on gradients and the absolute values of the lambda signal pattern may also take place for the described integration method(s).

Figure 5:
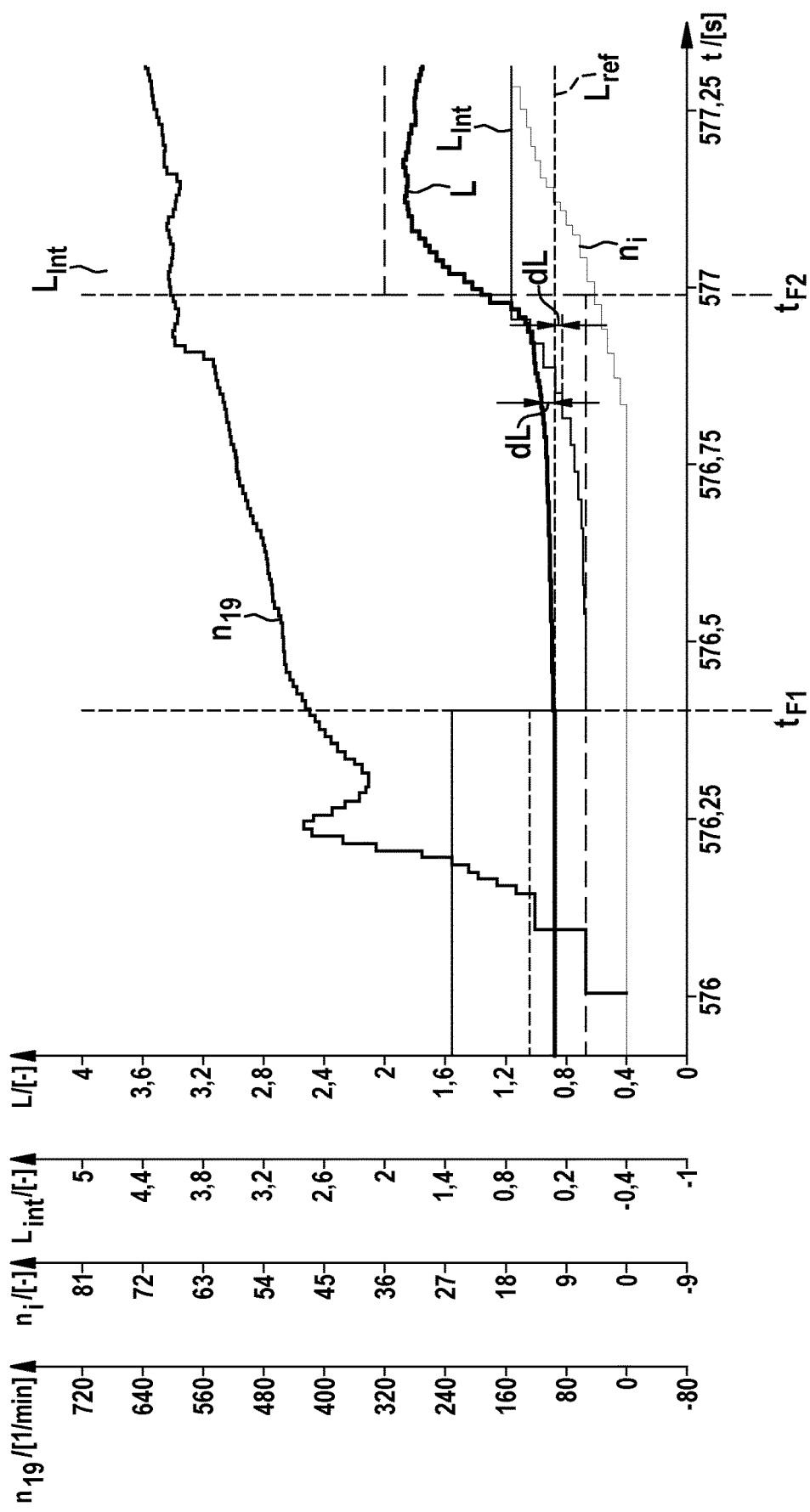
FIG. 5 shows a diagram which in principle corresponds to the diagram in FIG. 3, the system state being faulty.

FIG. 5 illustrates a further example of an analysis of a starting behavior of an internal combustion engine 10. The curves illustrated here allow the indication that an element 44 is causing a leak. The sequence illustrated in FIG. 5 fully corresponds to the sequence illustrated in FIG. 4. At the start of measuring window tF1, an instantaneous lambda value L is ascertained, preferably at regular intervals, for example once per stroke of internal combustion engine 10. For this lambda value L, a difference dL from reference lambda value Lref is ascertained, and an integrator value of the difference lambda value, illustrated by curve Lint, is ascertained with the aid of the integration process described above. At the end of the measuring window at point in time tF2 it may be established that the diagnostic value, i.e., the integrator value in the present case, is 2.0. This value is smaller than a threshold, not numerically stated here (but which may be 4.0, for example), which separates fully functional internal combustion engines 10 including fully functional elements 44 from not fully functional internal combustion engines 10 including defective, leaking elements 44. The internal combustion engine 10 diagnosed here is thus not functioning properly.

Figure 6:
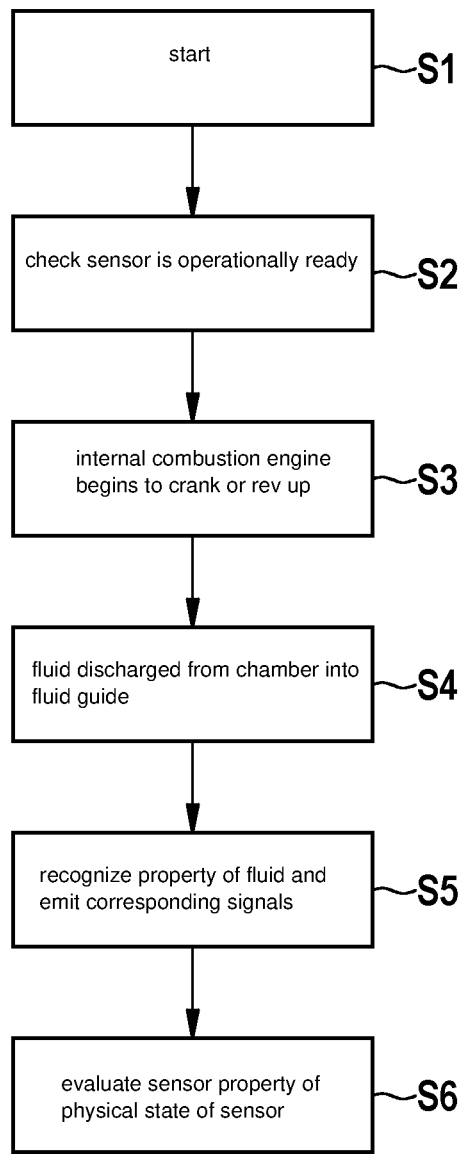
FIG. 6 schematically shows an illustration of the sequence of the method in accordance with an example embodiment of the present invention.

The provided method in accordance with the present invention is illustrated in brief in FIG. 6. At the start of the method with step S1, for example in a further step S2 it is ensured that sensor 48 is operationally ready. For this purpose, it may be necessary, for example, for sensor 48 to be brought to operating temperature beforehand, using a sensor heater, in a step not illustrated here. Internal combustion engine 10 thus begins to crank or rev up in a subsequent step S3 due to the auxiliary drive machine mentioned above, so that drive shaft 19 and the other parts of the engine, such as the connecting rod and piston 15, and ultimately also the valves such as intake valves 29 and exhaust valves 33, start to move. Due to the above-mentioned motion of exhaust valves 33, it is then possible for fluid 40 to be discharged from chamber 23 into fluid guide 42 in a step S4, and operationally ready sensor 48 is thus able to recognize the property of fluid 40 and emit corresponding signals to control and/or regulation device 50 (S5). The sensor property or its physical state is evaluated in further step S6, and an instantaneous lambda value L is thus ascertained in step S6. For example, the provided integration process may come into consideration within the scope of the evaluation. Alternatively, it is possible (also compare to FIG. 3) to evaluate the exceedance or nonexceedance of a lambda value L, in the present case for example an absolute value of a lambda value of 1.1. For example, at which point in time between limits tF1 and tF2 of the measuring window this threshold is exceeded is to be used as a criterion. If this is essentially approximately in the middle or, for example, in the range of the measuring window at a certain point in time, it may be deduced that element 44 is in a properly functioning, i.e., nonleaking, state. If the mentioned threshold value of lambda=1.1 in the present case is exceeded, for example, only after the elapse of approximately 90% of the time constituting the measuring window or at a certain point in time in the range of the measuring window, i.e., much later than would be the case with a properly functioning element 44, it may be deduced that element 44 is defective because it is leaking.

Since the method provided here in accordance with the present invention is to take place in such a way that fluid 40 is to be uninfluenced by controlled supply of fuel 54, according to the method it is to be provided that the analysis of fluid 40 for a leak quantity of fuel 54 is ended, for example, after the start of controlled supply of fuel 54 into chamber 23, but at the latest, before fluid 40 that has flowed from this chamber 23 reaches sensor 48. In particular, it is provided that the analysis takes place before fuel 54 is supplied, in particular into chamber 23 or into fluid guide 42, by activating an element 44 of internal combustion engine 10. During the analysis, a signal of sensor 48 is evaluated, and a proportion of in particular uncombusted or partially combusted fuel in the fluid is ascertained. If no leak quantity or a permissible leak quantity is deduced in the analysis due to the evaluation of the signal of sensor 48, according to one variant of this method, operation of internal combustion engine 10 is continued. Within the scope of the method, during the analysis an impermissibly high leak quantity may be deduced due to the evaluation of the signal of sensor 48. One of the possible consequences is that operation of internal combustion engine 10 is continued. One alternative variant may be that operation of internal combustion engine 10 is not continued. According to the described integrator method or the described threshold value method for lambda, it is provided that a signal pattern of the sensor is compared to a reference signal pattern, and an impermissibly high leak quantity, and thus a defective element 44, is deduced when a threshold of a deviation is exceeded. According to a further step of the method, it is provided that an earliest start tF1 of a signal evaluation of sensor 48 and/or a latest end tF2 of a signal evaluation of sensor 48 are/is determined. The end of the signal evaluation refers to the associated result, in which an end of a signal evaluation is understood to mean for the purpose of recognizing an impermissibly high leak quantity. A signal evaluation of sensor 48 is normally continued, but generally for air pollution control.

An earliest start tF1 of a signal evaluation of sensor 48, and thus the start of the measuring window, may be made as a function of a rest rotational position of a drive shaft 19 of internal combustion engine 10. This applies in particular under the aspect that the earlier a next exhaust valve 33 of the crank drive of internal combustion engine 10 opens a combustion chamber or chamber 23, the earlier a start tF1 is established. Thus, if a next opening point in time of an exhaust valve 33 is imminent, a start tF1 of the measuring window may be set to an early point in time. However, taking into account the processes in an internal combustion engine 10, it is also apparent that this start of the measuring window may also be set later. An exhaust valve 33 typically opens, for example, around a drive shaft position of 120 crankshaft degrees or drive shaft according to the so-called TDC. However, this situation is typically followed first by a downward movement of piston 15, so that when internal combustion engine 10 is in a somewhat cold state, fluid 40 initially does not leave chamber 23.

Rather, in such a moment, fluid 40 is initially drawn from the fluid guide (exhaust system) back into chamber 23. Only upon passage through bottom dead center, between the so-called power stroke and the exhaust stroke, is there an option for fluid 40 containing a leak quantity of fuel 54 to be discharged from chamber 23 into fluid guide 42. When the integrator method is used, latest start tF1 of measuring window (or just prior to same) is to be set when this gas quantity reaches sensor 48. Thus, when the integrator method is used, it is provided, for example, that a start of a signal evaluation of sensor 48, and thus start tF1 of the measuring window, begins at the latest with the start of an expected increase of a lambda value L. In the mentioned method with threshold value decision, for a decision that an element 44 is functioning properly, it is ultimately important that a certain threshold value is not reached at a predetermined point in time. This means that the measuring window may also start after the predetermined point in time, and due to the fact that the threshold value is not exceeded, it may be immediately decided that elements 44 are functioning properly. Sensor 48 must be heated to a temperature, i.e., its operating temperature, before starting a legitimate analysis. Thus, the operating temperature of sensor 48 is to be reached at the right time in the method sequence before starting the analysis. In addition, with start tF1 of the analysis, a predetermined standstill time (stop phase, first standstill time) of internal combustion engine 10 is to have reached a certain minimum duration. In particular, it is provided within the scope of the method that an analysis begins during a first exhaust stroke (gas exchange) of a cylinder 13.

In conjunction with short standstill times (second standstill time) of internal combustion engine 10, it has been established that a signal pattern L (FIG. 3) cannot be attributed to a defective element, since the time for an appreciable or indirectly measurable escape of fuel 54 due to a leak is too brief. Short standstill times are understood to mean, for example, second time periods (5 s or 30 s or 100 s, for example) which occur with start-stop systems, for example. This means that a first standstill time is much longer than a second standstill time. A first standstill time may, for example, include a pause between two trips, or may last for several hours, while a second standstill time occurs during travel. This signal pattern L shows that the lambda signal is already increasing very early toward rich. This means that internal combustion engine 10 must include a low proportion of air or a high proportion of fuel 54 in the discharged air/fuel mixture. Based on the short standstill time (second standstill time), it is deduced that the relatively high proportion of fuel 54 originates not from element 44, but from some other source. This other source may be, for example, a fuel component in the so-called oil pan of internal combustion engine 10. In particular for older motor vehicles and/or motor vehicles for which a fairly long time has passed since the oil was changed, a fuel component may be identified in the oil pan (oil-fuel mixture). A portion of this fuel component may flow past the crankcase of internal combustion engine 10 and, for example, across piston rings that are already fairly heavily worn and into chamber 23.

For such cases, it is provided to use dynamic reference values for the different procedures.

Since it has thus far been provided, for example, that a threshold of the integrator value is 4.0, and the threshold separates fully functional internal combustion engine 10 including fully functional elements 44 from not fully functional internal combustion engine 10 including defective, leaking elements 44, a dynamically adapted reference value is to apply for such cases. By integration of values Ldiff, as described above, for such cases (short standstill times) an integrator value is ascertained which is to apply as a dynamically adapted reference value—in the present case, dynamically adapted integrator value Lint,dyn=2.3.

Alternatively, time tschw may also be changed as a dynamically adapted reference value for such cases. Thus, for example, time tschw,dyn may be set, by which time signal pattern L at the latest must have reached threshold value Lschw in order to recognize internal combustion engine 10 as fully functional. Time tschw,dyn may be formed as the sum of a measured time tgem at which signal pattern L has actually reached threshold value Lschw, and a time allocation dt.

Consequently, in accordance with an example embodiment of the present invention, a method step is provided according to which a) if the integrator value falls below a threshold of integrator value Lint, and the standstill time falls below the predetermined first standstill time, or b) if threshold value Lschw is exceeded after time tschw elapses, and the standstill time falls below the predetermined second standstill time of internal combustion engine 10, a reference value, integrator value Lint,dyn, or time tschw,dyn by which time signal pattern L has reached value Lschw is dynamically adapted.

What is claimed is:

1. A method for analyzing a fluid that flows from a combustion chamber of an internal combustion engine into a fluid guide, the internal combustion engine including at least one element configured to supply fuel, the method comprising the following steps:
   analyzing the fluid using a lambda sensor on which the fluid in the fluid guide acts;
   wherein the analysis takes place during cranking of the internal combustion engine, and the fluid acting on the sensor is not influenced by fuel that is supplied in a controlled manner;
   wherein the analysis includes analyzing the fluid for a leak quantity of the fluid, and the analysis of the fluid for the leak quantity of the fuel is ended before the fluid, which has flowed out of the chamber and which is enriched with fuel supplied in a controlled manner, reaches the sensor.

2. The method as recited in claim 1, wherein the at least one element is an injector.

3. The method as recited in claim 1, wherein the analysis of the fluid for the leak quantity of the fuel is ended after the controlled supply of fuel into the chamber begins.

4. The method as recited in claim 1, wherein the analysis takes place prior to the supply of fuel into the chamber or into the fluid guide, which takes place by activating an element of the internal combustion engine.

5. The method as recited in claim 1, wherein in the analysis, a signal of the sensor is evaluated, and a proportion of uncombusted or partially combusted fuel in the fluid is ascertained.

6. The method as recited in claim 5, wherein no leak quantity or a permissible leak quantity is deduced in the analysis due to the evaluation of the signal of the sensor, and operation of the internal combustion engine is continued.

7. The method as recited in claim 5, wherein an impermissibly high leak quantity is deduced in the analysis due to the evaluation of the signal of the sensor.

8. The method as recited in claim 5, wherein an earliest start of the signal evaluation of the sensor and/or a latest end of the signal evaluation of the sensor is determined.

9. The method as recited in claim 5, wherein a start of the signal evaluation of the sensor begins at the latest with a start of an expected increase of a lambda value.

10. The method as recited in claim 1, wherein prior to starting the analysis, the sensor is heated to a temperature, the temperature being an operating temperature of the sensor.

11. The method as recited in claim 1, wherein a sensor signal that represents a fluid containing uncombusted fuel is associated with a certain cylinder, and the sensor signal is thus associated with a certain element that is associated with the cylinder.

12. A method for analyzing a fluid that flows from a combustion chamber of an internal combustion engine into a fluid guide, the internal combustion engine including at least one element configured to supply fuel, the method comprising the following steps:
   analyzing the fluid using a lambda sensor on which the fluid in the fluid guide acts;
   wherein the analysis takes place during cranking of the internal combustion engine, and the fluid acting on the sensor is not influenced by fuel that is supplied in a controlled manner;
   wherein multiple instantaneous sensor measured values of the sensor are ascertained within a measuring window, for each of the instantaneous measured values, a difference between the instantaneous sensor measured value and a reference value is ascertained, and the differences are added together to form an instantaneous integrator value, and after a defined number of differences, the instantaneous integrator value is compared to an error threshold in order to decide whether the element is defective or not defective.

13. The method as recited in claim 12, wherein the analysis includes analyzing the fluid for a leak quantity of the fluid, and the analysis of the fluid for the leak quantity of the fuel is ended before the fluid, which has flowed out of the chamber and which is enriched with fuel supplied in a controlled manner, reaches the sensor.

14. The method as recited in claim 12, wherein a signal pattern of the sensor is compared to a reference value, and in the event that a deviation exceeds a threshold after a certain time has elapsed after the measuring window starts, an impermissibly high leak quantity and a defective element are deduced.

15. The method as recited in claim 12, wherein a signal pattern of the sensor is compared to a reference value, and in the event that a deviation exceeds a threshold prior to a certain time after the measuring window starts, a properly functioning element is deduced.

16. The method as recited in claim 12, wherein upon a start of the analysis, a predetermined standstill time of the internal combustion engine at least reaches a certain minimum duration.

17. The method as recited in claim 16, wherein a) if the integrator value falls below a threshold of the instantaneous integrator value, and the standstill time falls below the predetermined first standstill time, or b) if the threshold value is exceeded after the certain time elapses, and the standstill time falls below a predetermined second standstill time of the internal combustion engine, a reference value is dynamically adapted.

18. A method for analyzing a fluid that flows from a combustion chamber of an internal combustion engine into a fluid guide, the internal combustion engine including at least one element configured to supply fuel, the method comprising the following steps:
analyzing the fluid using a lambda sensor on which the fluid in the fluid guide acts;
wherein the analysis takes place during cranking of the internal combustion engine, and the fluid acting on the sensor is not influenced by fuel that is supplied in a controlled manner;
wherein in the analysis, a signal of the sensor is evaluated, and a proportion of uncombusted or partially combusted fuel in the fluid is ascertained;
wherein an earliest start of the signal evaluation of the sensor is a function of a rest rotational position of a drive shaft of the internal combustion engine so that the earlier a next exhaust valve of a combustion chamber opens, the earlier is the start.

19. A device, comprising:
a control and/or regulation device of an internal combustion engine;
wherein the device is configured to analyze a fluid that flows from a combustion chamber of an internal combustion engine into a fluid guide, the internal combustion engine including at least one element configured to supply fuel, the device being configured to:
analyze the fluid using a lambda sensor on which the fluid in the fluid guide acts;
wherein the analysis takes place during cranking of the internal combustion engine, and the fluid acting on the sensor is not influenced by fuel that is supplied in a controlled manner;
wherein the analysis includes analyzing the fluid for a leak quantity of the fluid, and the analysis of the fluid for the leak quantity of the fuel is ended before the fluid, which has flowed out of the chamber and which is enriched with fuel supplied in a controlled manner, reaches the sensor.

20. A non-transitory machine readable storage medium on which is stored a computer program for analyzing a fluid that flows from a combustion chamber of an internal combustion engine into a fluid guide, the internal combustion engine including at least one element configured to supply fuel, the computer program, when executed by a control and/or regulation device of the internal combustion engine, causing the control and/or regulation device to perform the following steps:
analyzing the fluid using a lambda sensor on which the fluid in the fluid guide acts;
wherein the analysis takes place during cranking of the internal combustion engine, and the fluid acting on the sensor is not influenced by fuel that is supplied in a controlled manner;
wherein the analysis includes analyzing the fluid for a leak quantity of the fluid, and the analysis of the fluid for the leak quantity of the fuel is ended before the fluid, which has flowed out of the chamber and which is enriched with fuel supplied in a controlled manner, reaches the sensor.

\* \* \* \* \*